United States Patent
Mutikainen et al.

(10) Patent No.: US 8,111,712 B2
(45) Date of Patent: Feb. 7, 2012

(54) APPARATUS, METHOD, SYSTEM AND PROGRAM FOR COMMUNICATION

(75) Inventors: Jari Mutikainen, Helsinki (FI); Miikka Juhana Poikselkä, Helsinki (FI)

(73) Assignee: Nokia Siemens Networks Oy, Espoo (FI)

( * ) Notice: Subject to any disclaimer, the term of this patent is extended or adjusted under 35 U.S.C. 154(b) by 93 days.

(21) Appl. No.: 12/101,045

(22) Filed: Apr. 10, 2008

(65) Prior Publication Data
US 2009/0257433 A1 Oct. 15, 2009

(51) Int. Cl.
*H04J 3/22* (2006.01)

(52) U.S. Cl. ........ 370/466; 370/467; 370/401; 370/351; 370/356

(58) Field of Classification Search .................. 370/229, 370/230, 254, 255, 259, 260, 261, 310, 310.2, 370/328, 331, 351, 352, 389, 390, 401, 410, 370/437, 464, 465, 466, 467, 474, 475
See application file for complete search history.

(56) References Cited

U.S. PATENT DOCUMENTS

| | | | |
|---|---|---|---|
| 6,937,597 B1* | 8/2005 | Rosenberg et al. | 370/356 |
| 7,366,163 B1* | 4/2008 | Samarasinghe et al. | 370/352 |
| 7,489,771 B2* | 2/2009 | McMurry et al. | 379/201.01 |
| 7,555,555 B2* | 6/2009 | Park et al. | 709/227 |
| 7,668,159 B2* | 2/2010 | Buckley et al. | 370/354 |
| 7,751,354 B2* | 7/2010 | Tuijn et al. | 370/310 |
| 2003/0126257 A1* | 7/2003 | Vijay | 709/224 |
| 2006/0268781 A1* | 11/2006 | Svensson et al. | 370/331 |
| 2007/0038723 A1* | 2/2007 | Gourraud | 709/218 |
| 2007/0064672 A1* | 3/2007 | Raghav et al. | 370/351 |
| 2007/0091830 A1* | 4/2007 | Coulas et al. | 370/260 |
| 2007/0133517 A1* | 6/2007 | Miller et al. | 370/352 |
| 2007/0136459 A1* | 6/2007 | Roche et al. | 709/224 |
| 2007/0281680 A1* | 12/2007 | Raju et al. | 455/422.1 |
| 2008/0037447 A1* | 2/2008 | Garg et al. | 370/260 |
| 2008/0080480 A1* | 4/2008 | Buckley et al. | 370/352 |
| 2009/0068996 A1* | 3/2009 | Bakker et al. | 455/414.1 |

FOREIGN PATENT DOCUMENTS
WO WO 2006/125471 * 11/2006

OTHER PUBLICATIONS

Johnston et al.; "Session Initiation Protocol Service Examples: draft-ietf-sipping-service-examples-13.txt"; Jul. 16, 2007; IETF Standard Working Draft, Internet Engineering Task Force, pp. 1-162.*

Rosenberg, J; "Obtaining and Using Globally Routable User agent (UA) URIs (GRUU) in Session Initiation Protocol (SIP); draft-ietf-sip-gruu-11.txt"; Oct. 11, 2006; IETF Standard Working Draft, Internet Engineering Task Force; pp. 1-35.*

(Continued)

*Primary Examiner* — Hassan Phillips
*Assistant Examiner* — Mark A Mais
(74) *Attorney, Agent, or Firm* — Harrington & Smith

(57) ABSTRACT

Embodiments provide an apparatus, method, and storage medium wherein a communication identifier of a session or part of a session is provided in a package or added to a message. An apparatus may check, based on the communication identifier of package or the received communication identifier, whether or not a service indicated by the communication identifier is supported. A decision of transferring the service may be based on the communication identifier.

19 Claims, 7 Drawing Sheets

OTHER PUBLICATIONS

RIM; "Definition of feature tag for IARI/ICSI"; 3rd Generation Partnership Project (3GPP); 3GPP TSG CT1 Meeting #48, Vienna, Austria, Aug. 20-24, 2007.*

Drage K. "A Session Initiation Protocol (SIP) Extension for the Identification of Services; draft-drage-sipping-service-identification-01"; Jul. 9, 2007; IETF Network Working Draft, Internet Engineering Task Force; pp. 1-20.*

"3$^{rd}$ Generation Partnership Project; Technical Specification Group Services and Architecture; Feasibility Study on Multimedia Session Continuity; Stage 2 (Release 8)", 3GPP TR 23.893 V1.2.1 (Mar. 2008), 60 pgs.

"An INVITE-Initiated Dialog Event Package for the Session Initiation Protocol (SIP)", J. Rosenberg et al., Network Working Group, RFC4235, Nov. 2005, 39 pgs.

"Conveying Feature Tags with the Session Initiation Protocol (SIP) REFER Method", C. Levin et al., Network Working Group, RFC4508, May 2006, 6 pgs.

"The Session Description Protocol (SDP) Label Attribute", C. Levin et al., Network Working Group, RFC4574, Aug. 2006, 8 pgs.

"3$^{rd}$ Generation Partnership Project; Technical Specification Group Services and System Aspects; IP Multimedia Subsystem (IMS); Stage 2 (Release 9)", 3GPP TR 23.228 V9.2.0 (Dec. 2009), Section 4.13.2.

Student: Chen-Jui Peng, Advisor: Ren-Hung Hwang, "SSIP: Split a SIP Session over Multiple Devices", Internet Citation, XP-007904234, URL; http://140.123.21.32/ETD-db/ETD-search/getfile?URN=etd-0727105-020000&filename=etd-0727105-020000.pdf> (retrieved Mar. 4, 2008), p. 12—line 1, p. 17—line 4, p. 19—line 1, p. 30—line 3.

J. Rosenberg et al., "An INVITE-Initiated Dialog Event Package for the Session Initiation Protocol (SIP)", Network Working Group, RFC4235.txt, Nov. 1, 2005, XP015043182; p. 4, paragraph 3-p. 8, paragraph 3.7; p. 14, paragraph 4.1.1-p. 17, paragraph 4.2.

R. Mahy et al., The Session Initiation Protocol (SIP) "Replaces" Header, Network Working Group; Request for Comments: RFC 3891, Category: Standards Track, Sep. 2004.

* cited by examiner

```
<dialog id="123456">
    <state>confirmed</state>
    <duration>274</duration>
    <ICSI> urn:urn-xxx:3gpp-service.ims.icsi.mmtel </ICSI>
    <IARI> urn:urn-xxx:3gpp-service.ims.iari.xyz </IARI>
    <local>
        <identity display="Alice">sip:alice@example.com</identity>
        <target uri="sip:alice@pc33.example.com">
            <param pname="isfocus" pval="true"/>
            <param pname="class" pval="personal"/>
        </target>
    </local>
    <remote>
        <identity display="Bob">sip:bob@example.org</identity>
        <target uri="sip:bobster@phone21.example.org"/>
    </remote>
</dialog>
```

Fig. 7

APPARATUS, METHOD, SYSTEM AND PROGRAM FOR COMMUNICATION

FIELD OF TECHNOLOGY AND BACKGROUND

The invention generally relates to apparatuses, method, network elements, systems and programs e.g. for communication or data connection etc, wherein e.g. a session or session part may be transferred.

Session continuity includes procedures for seamlessly, i.e. without disturbing interruption, continuing a session. E.g. when a mobile station such as a user equipment, UE, moves from an old access to a new access, the session or part of the session such as data components like media components in the session should continue seamlessly in the new access. As an example, when a user equipment moves from a wireless local area network, WLAN, to a UTRAN (universal mobile telecommunications system, UMTS, terrestrial radio access network), the complete session, e.g. a session initiation protocol, SIP, session, or part of the session such as media components in the session should continue seamlessly in the new access. Further, when a session or part thereof is to be retrieved by, or transferred to, a user equipment, the session should continue.

Session continuity may also be provided in other cases, for instance including the same or similar procedures in conjunction with a call. As an example, in case of voice call continuity, VCC, a voice session may be transferred from/to circuit switched, CS, domain using VCC but a session such as a data session e.g. based on SIP, may be transferred using multimedia session continuity, MMSC, procedures. Session continuity also applies to and covers procedures where the sessions or media components in the session are transferred between multiple devices.

Multimedia session continuity, MMSC, provides procedures for session continuity using protocol mechanisms such as session initiation protocol, SIP mechanisms. An example of session continuity such as 3GPP release 8 Multimedia session continuity, MMSC, is e.g. described in TR 23.893.

SUMMARY

In accordance with at least one or more embodiments, a communication identifier such as a communication service identifier may be provided in e.g. a dialog event. In embodiments, the communication identifier may be or include a communication service identifier or an application reference identifier or may comprise both a communication service identifier and an application reference identifier.

Embodiments of an apparatus or method allow partial or complete retrieval or transfer of a session such as a session comprising media components. The session may be managed in accordance with a protocol for initiating a session such as a session initiation protocol, e.g. SIP or a protocol of arbitrary other type.

In accordance with one or more embodiments of the invention an apparatus is provided which comprises a checker configured to check a communication identifier of a session or part of a session, and a transferrer configured to transfer the session or part of the session from or to the apparatus depending on the communication identifier.

Such an apparatus may comprise e.g. a detector configured to detect or learn session details of the session or part of the session, wherein the session details comprise at least one of the communication identifier,
  a communication service identifier,
  an internet protocol multimedia subsystem communication service identifier,
  at least one session ongoing media stream,
  at least one stream label,
  a call identifier,
  one or more media components of a session,
  a reference identifier,
  an application reference identifier, and
  an internet protocol multimedia subsystem application reference identifier.

The session may e.g. be at least one of a data session, a voice call session, a session according to a protocol for initiating a session, and a session initiation protocol session.

In accordance with one or more embodiments of the invention the apparatus may comprise a detector configured to detect support of a service based on the communication identifier, and to decide on transferring the service depending on the communication identifier.

The decision on transferring may be made on a target side, e.g. in a target user equipment, comprising such an apparatus, or may be made on a source side, e.g. in a source user equipment comprising such an apparatus.

The term transferring, as used in the present document, is to be understood as representing at least one of a case of retrieving a service by a target apparatus, e.g. a target user equipment, from a source apparatus such as a source user equipment, and a case of transferring from a source apparatus, e.g. a source user equipment, to a target apparatus such as a target user equipment, as well as other cases.

In an example embodiment a target user equipment may receive a transfer request and the detector/checker may decide whether the target UE is able to accept transfer request.

In accordance with one or more embodiments of the invention the apparatus may comprise a detector configured to detect support of a service based on the communication identifier, and to make decision to initiate retrieve operation depending on the communication identifier.

In accordance with one or more embodiments of the invention the apparatus may comprise a processor configured to receive a request to retrieve a session or media, to perform a subscription to a dialog event package, and to detect the communication identifier in the dialog event package.

The processor may e.g. be configured to receive the subscription from at least one of a multimedia system, a user equipment and an application server.

In accordance with one or more embodiments of the invention an apparatus may comprise
  means for checking a communication identifier of a session or part of a session,
  means for transferring the session or part of the session from or to the apparatus depending on the communication identifier.

Such an apparatus may comprise e.g.:
  means for learning or providing session details of the session or part of the session, wherein the session details comprise at least one of the communication identifier, a communication service identifier, an internet protocol multimedia subsystem communication service identifier, of an ongoing session according to a protocol for initiating a session, at least one session ongoing media stream, at least one stream label, a call identifier, one or more media components of a session, a reference identifier, an application reference identifier, and an internet protocol multimedia subsystem application reference identifier.

In accordance with one or more embodiments of the invention the apparatus may be at least one of a terminal, mobile station, user equipment, module, chipset.

In accordance with one or more embodiments of the invention a method may comprise:

checking a communication identifier of a session or part of a session, transferring the session or part of the session depending on the communication identifier.

Such a method may further comprise:

learning or providing session details of the session or part of the session, wherein the session details comprise at least one of the communication identifier, a communication service identifier, an internet protocol multimedia subsystem communication service identifier, at least one session ongoing media stream, at least one stream label, a call identifier, one or more media components of a session, a reference identifier, an application reference identifier, and an internet protocol multimedia subsystem application reference identifier.

The session may e.g. be at least one of a data session, a voice call session, a session according to a protocol for initiating a session, and a session initiation protocol session.

The method may e.g. comprise:

checking support of a service based on the communication identifier, and deciding on transferring the service depending on the check result.

As mentioned above, the term transferring, as used in the present document, covers at least one or more of a case of retrieving e.g. a service such as a media stream etc, a case of transferring from a source to a target, as well as other cases.

The method may e.g. comprise: checking support of a service based on the communication identifier and deciding to initiate retrieve operation depending on the check result.

In accordance with one or more embodiments of the invention the method may comprise:

receiving a request to retrieve a session or media, performing a subscription to a dialog event package, and detecting the communication identifier in the dialog event package.

The method may comprise receiving the subscription from at least one of a multimedia system, a user equipment and an application server.

Such a method may further comprise:

checking support of a service based on the communication identifier and deciding to initiate retrieve operation depending on the check result. For example when the user equipment supports communication identifier used in the ongoing session it may start retrieve procedure.

In accordance with one or more embodiments of the invention a dialog event package may be configured to allow a user to subscribe to another user or to receive notification of a change in state of a dialog usage, the package comprising at least one of the communication identifier, a communication service identifier, an internet protocol multimedia subsystem communication service identifier, a reference identifier, an application reference identifier, and an internet protocol multimedia subsystem application reference identifier.

The dialog event package may e.g. be in accordance with RFC4235 and may additionally comprise the communication identifier.

In accordance with one or more embodiments of the invention an apparatus may be configured to add a communication identifier of a session or part of a session to a message, send the message comprising the added identifier to another apparatus.

In accordance with one or more embodiments of the invention a non-transitory computer readable storage medium may comprise computer executable components configured to carry out or implement, when run on the computer, checking a communication identifier of a session or part of a session, and transferring the session or part of the session depending on the communication identifier.

As mentioned above, the term transferring is to be understood as comprising at least one of transferring and retrieving.

The storage medium may comprise code means configured to:

learn or provide session details of the session or part of the session, wherein the session details comprise at least one of the communication identifier, a communication service identifier, an internet protocol multimedia subsystem communication service identifier, of an ongoing session according to a protocol for initiating a session, at least one session ongoing media stream, at least one stream label, a call identifier, one or more media components of a session, a reference identifier, an application reference identifier, and an internet protocol multimedia subsystem application reference identifier.

The storage medium may e.g. comprise:

code means for checking support of a service based on the communication identifier, and for deciding on transferring the service depending on the communication identifier. As an example, the deciding on transferring may e.g. be a deciding on initiating retrieve procedure depending on the communication identifier.

Other objects, features and advantages of the invention will become apparent from the following description of embodiments of the invention.

BRIEF DESCRIPTION OF DRAWINGS

FIG. 7 shows a further embodiment of the invention.

DESCRIPTION OF EMBODIMENTS

Figure 1:
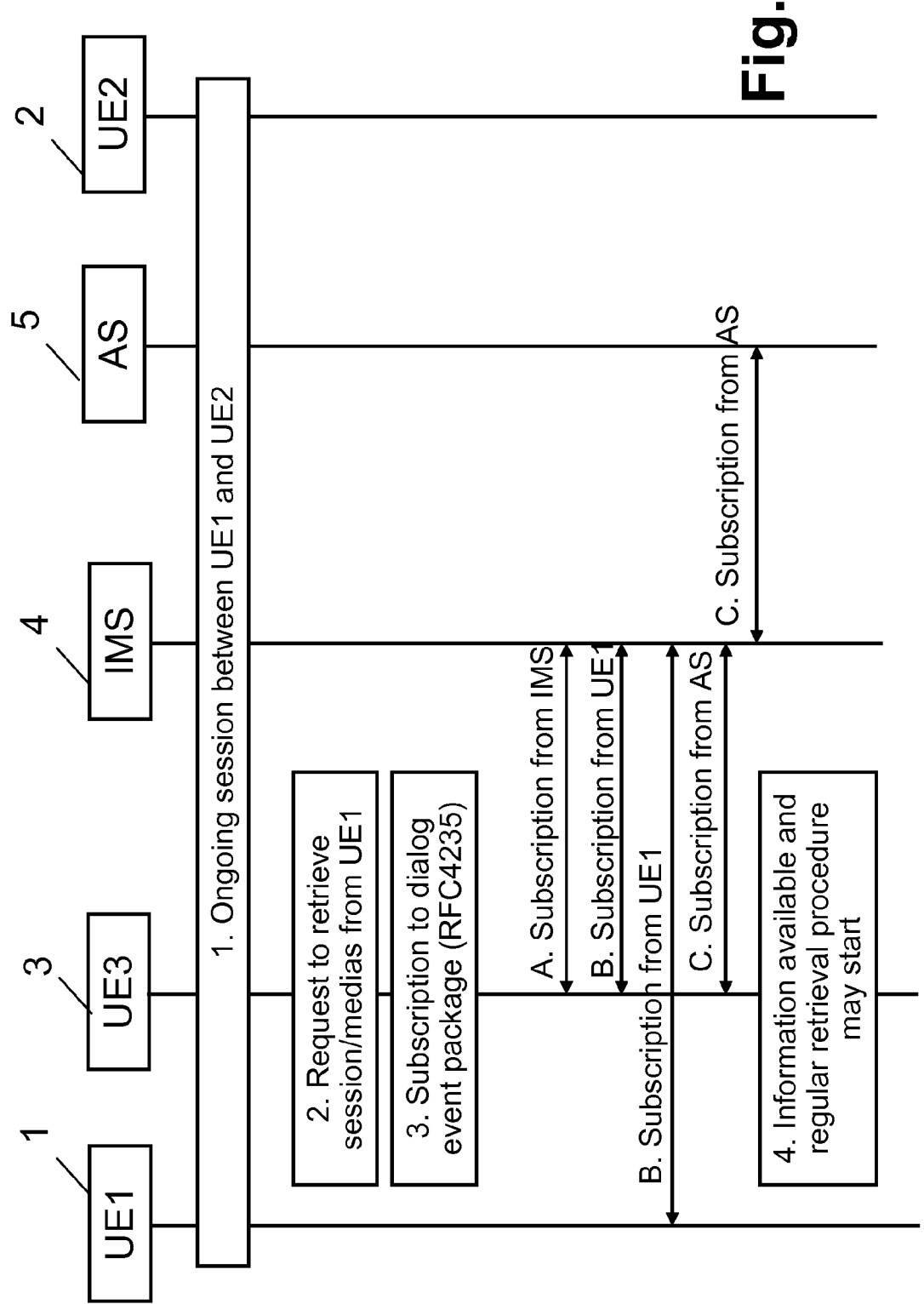
FIG. 1 shows embodiments in accordance with implementations of the invention.

In accordance with one or more embodiments of the invention, a communication identifier such as a communication service identifier e.g. an internet protocol multimedia subsystem, IMS, communication service identifier may be provided in or as part of a dialog event such as a dialog event package of a protocol for initiating a session such as session initiation protocol SIP. One or more embodiments relate to multimedia session continuity mechanisms such as SIP mechanisms.

Generally, SIP events framework defines general mechanisms for subscription to, and notification of, events within SIP networks. The framework introduces the notion of a package, which is a specific instantiation of the events mechanism for a defined set of events. Packages have been defined for user presence, watcher information, and message waiting indicators, amongst others. An event package may be provided for INVITE-initiated dialog usages. Dialogs refer e.g. to a SIP relationship established between two SIP peers. Dialogs can be created by many methods, such as by an invite method, a subscribe method and a notify method, which may also create new dialog usages. Embodiments may e.g. implement one or more of these methods or of other methods.

A variety of applications can be enabled through knowledge of invite dialog usage state. Some application examples include automatic callback; presence-enabled conferencing wherein a call is created automatically when A, B and C are all available; IM conference alerts wherein a user can receive an instant message (IM) on their phone whenever someone joins a conference that the phone is involved in; etc.

In general, the dialog package allows for construction of distributed applications, where the application is provided with information on dialog state but is not co-resident with the end user on which that state resides.

In accordance with one or more embodiments of the invention a user equipment may retrieve all or part of a session or media streams in an ongoing session, such as a SIP session. In accordance with one or more other embodiments of the invention, a user equipment may transfer or retrieve all or part of the media streams in an existing session, such as a SIP session, to a new access, or to another user equipment.

In case of a transfer between two user equipments, the operation may be performed from the source user equipment (transfer) or from the target user equipment (retrieval).

In case of retrieval such as media retrieval from source to target user equipment, the target or target user equipment is, in accordance with one or more embodiments, configured to learn or use a value of a communication identifier such as a service identifier value, e.g. a value of a communication service identifier value like an ICSI (IP multimedia subsystem communication service identifier) value of an ongoing session. Additionally or alternatively, the target user equipment may be configured to learn some or all details of the session such as e.g. ongoing media streams and their labels, call-id, etc. For this purpose, an extension to a dialog event, e.g. a SIP dialog event of RFC 4235 as an example, can be provided and used so as to enable the target user equipment to learn at least one of a communication identifier and media label, e.g. a session description protocol, SDP, media label, of an or more or each ongoing media stream in the source user equipment.

In accordance with one or more embodiments, a dialog event such as the SIP dialog event is enhanced to carry a communication identifier e.g. a communication service identifier such as the ICSI of the session. In accordance with one or more embodiments of the invention, the dialog event may additionally or alternatively carry a reference identifier such as an application reference identifier e.g. an internet protocol, IP, multimedia subsystem, IMS, application reference identifier, IARI, of the session, if any.

The target user equipment is configured to be able to perform a complete or partial replacement of the session. The target user equipment may perform the complete or partial replacement of the session, e.g. by referring to all, some, or a particular media stream label which it wants to be replaced, e.g. by a new media stream offer.

In accordance with one or more embodiments, the communication identifier may be an IMS communication service identifier, ICSI. An ICSI provides a framework for the identification of IMS communication services utilising IMS enablers. At terminals, the use of a communication service identifier allows identifying e.g. applications in a terminal and the network that use a protocol like SIP for communication purposes. In the terminal this may e.g. mean dispatching a SIP message to the correct application, and in the network it may e.g. mean selection of a correct application server. The communication service such as IMS communication service may contain an aggregation of zero, one, or several media components and the service logic managing the aggregation, represented in the protocols used.

A service description may specify this behaviour and states e.g. the allowed media combinations and state transitions as a consequence of signalling and use of IMS enablers in the network and terminals.

A target user equipment may use the value of the communication identifier or communication service identifier such as ICSI value in order to check or determine whether it supports the particular service. When the target user equipment supports the service value of the ongoing session, the target may perform the retrieval.

In accordance with one or more embodiments of the invention, a mechanism or ability to learn a communication identifier, such as a communication service identifier like e.g. an internet protocol multimedia subsystem, IMS, communication service identifier (ICSI) of an ongoing SIP session is provided.

FIG. 1 shows embodiments of at least one apparatus and method for learning, detecting, providing or using a communication identifier in a dialog event. The communication identifier may be used for retrieving a session or part of a session such one or more media streams. As shown in FIG. 1 as an example, a user equipment 1 and a user equipment 2 have an ongoing session as illustrated in block 1 "Ongoing session between UE1 and UE2". In the embodiment of FIG. 1, a user equipment 3 receives a request to retrieve the session or at least part of the ongoing session of block 1, such as one or more of media content or streams of the ongoing session. As shown in block 2, "Request to retrieve session/medias from UE1", the user equipment 3 may receive this request from the user equipment 1 in this example but may also receive such a request from other sources such as user equipment 2 or other components, or may decide by itself to retrieve the session or part of it.

In response to this request or decision, the user equipment 3 performs a subscription to a dialog or dialog event package, for example as defined in a standard such as RFC4235 or other documents but additionally comprising, as extension, a communication identifier such as ICSI for example.

The communication identifier of the ongoing session (block 1) may be delivered to the target user equipment 3 as part of a dialog event package.

In this embodiment the user equipment 3 is able to learn a communication identifier such as a communication service identifier or communication identifier by subscribing to the extended dialog event package which comprises the communication identifier.

FIG. 1 shows several alternative possibilities of performing the subscription and getting knowledge of the communication identifier.

According to an alternative A, the user equipment 3 may receive the subscription content from a multimedia system such as an internet protocol multimedia subsystem, IMS, 4, as shown by the double-headed arrow between user equipment 3 an IMS 4. As another possibility, as shown by alternative B, the user equipment 3 may communicate with the multimedia system such as IMS 4 which retrieves the subscription information from the source user equipment 1 and then sends the information to the target user equipment 3. According to an alternative C, the user equipment 3 may communicate with the multimedia system such as IMS 4 which retrieves the subscription information from another component or server such as an application server 5 and then sends the information to the target user equipment 3.

In the above alternatives A, B, C the entity acting as notifier can be e.g. user equipment 1 or a component in the multimedia system 4 such as a serving call state control function, S-CSCF in the IMS, or the application server 5 on top of IMS 4, for example.

When the information such as the communication identifier or the session details is available the retrieval procedure may start or continue, as shown in block 4. "Information available and regular retrieval procedure may start". The retrieval procedure may comprise at least one of retrieving the session or part of the session such as one or more media streams, of initiating a session between the user equipment 3 and the user equipment 2, and of transmitting the media stream of the session, or part thereof, between the user equipment 3 and the user equipment 2.

The server 5 may be configured to support multimedia session continuity, and may e.g. be implemented as a multimedia session continuity application server, MMSC AS. The server 5 may e.g. be configured to allow to merge a session such as a data session like a SIP session from the target user equipment 3 with a session such as a data session from source user equipment 1 only when they are for the same service.

When the target or target user equipment 2 retrieves the session or media from a service session it supports, the target may add the same communication identifier value to a session it initiates.

A transfer of an ongoing session or part of such a session like a SIP session from a source UE to a target UE is thus possible.

In accordance with one, more or all of the embodiments of the invention, a possibility or option of learning a communication identifier, e.g. a communication service identifier such as ICSI of an ongoing SIP session is provided.

In accordance with one or more embodiments of the invention, an apparatus such as user equipment 1 or 3 can transfer part of the media streams in an existing e.g. SIP session, either to a new access, or another UE. In case of a transfer between two user equipments, the operation may be performed from the source UE (transfer) or target UE (retrieval).

In accordance with one or more embodiments, when the target or target user equipment retrieves the media from a service session it supports, the target or target user equipment may add the same communication identifier value such as communication service identifier to the session it initiates.

Further embodiments will be described in the following.

A transfer procedure may be provided as follows.

In accordance with one or more embodiments, an extension, e.g. an indication of a communication identifier or communication service identifier, to a message, e.g. to a header of a message may be defined. The header may in one or more embodiments be a header of a protocol used for establishing or controlling a session such as a session initiation protocol, SIP. As an example, the header may be a SIP Replaces header e.g. such as mentioned in RFC 3891. The header such as a replaces header may be used to replace an existing dialog, e.g. SIP dialog, with a new dialog. The extension described here can be used to partially replace a dialog, e.g. the SIP dialog, i.e. to replace only certain media components in the existing dialog, while still maintaining rest of the media components in the old dialog.

In accordance with one or more embodiments, one or more communication identifiers may be transmitted or received as part of a transfer procedure. Communication identifiers such as multimedia subsystem or IMS communication identifier may be taken into account in different transfer cases.

Figure 2:
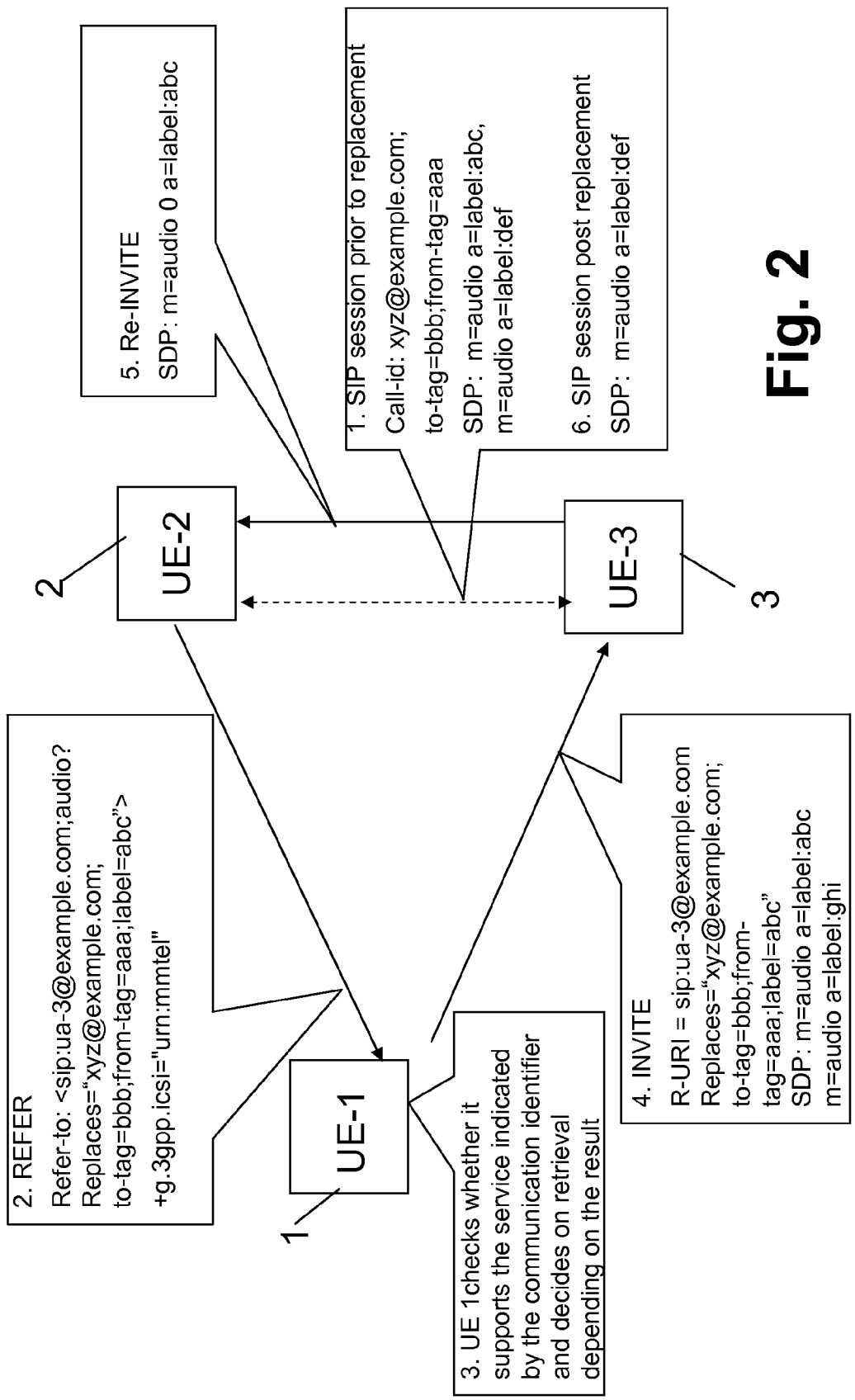
FIG. 2 illustrates another embodiment of a network, method, system and apparatuses in accordance with the invention.
Figure 3:
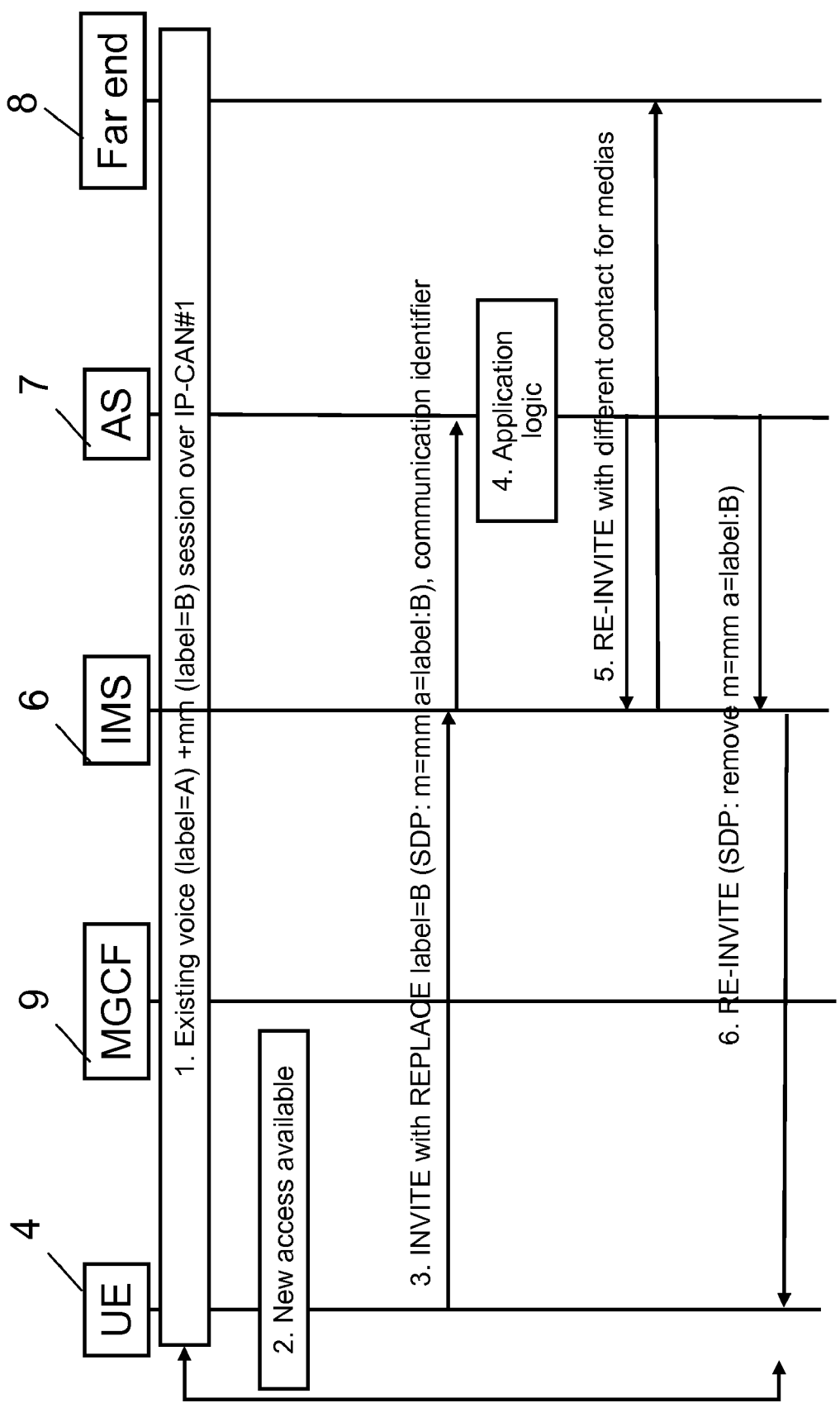
FIG. 3 shows further embodiments configured in accordance with implementations of the invention.
Figure 4:
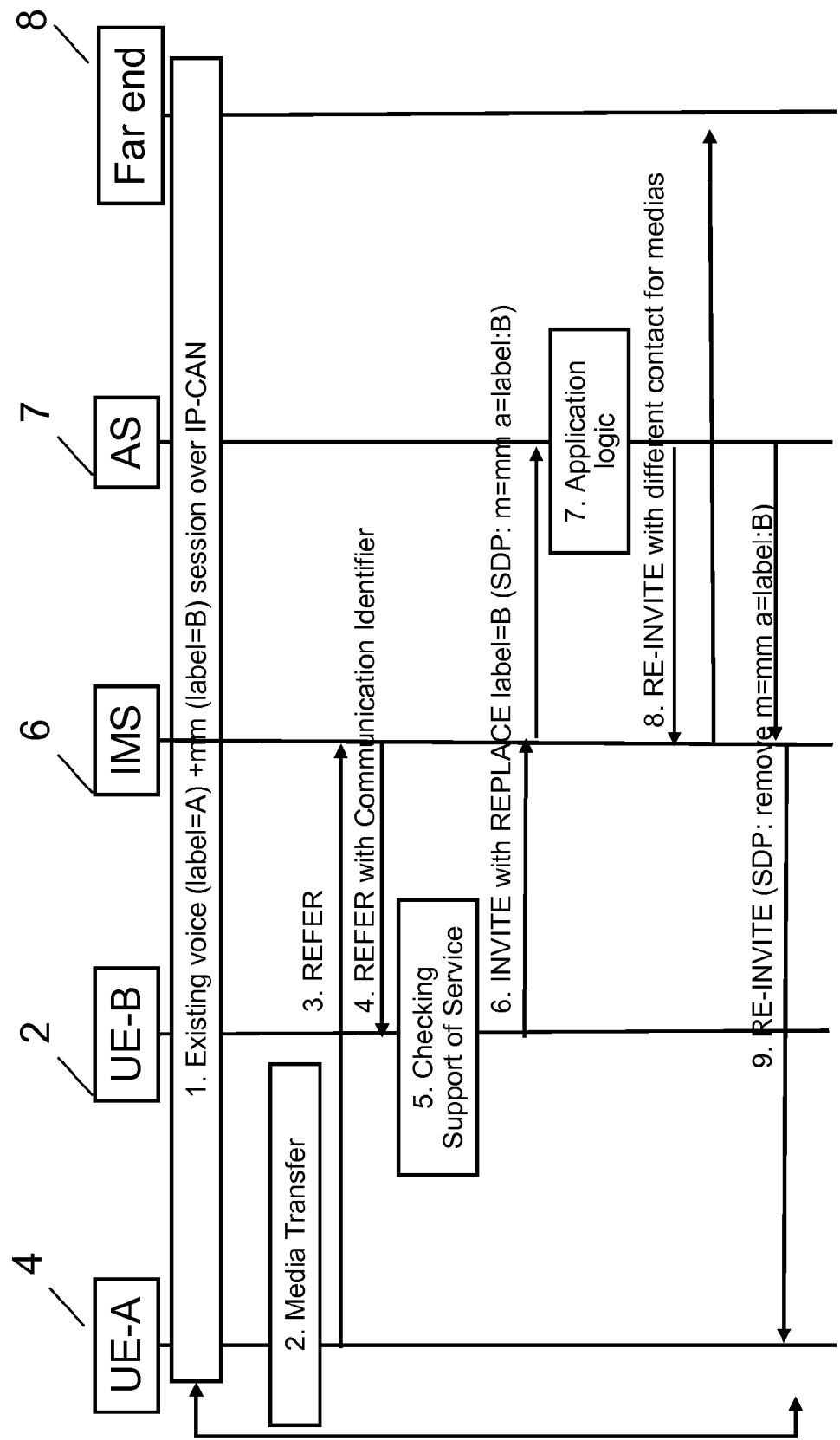
FIG. 4 illustrates other embodiments of the invention.

FIGS. 2 to 4 illustrate some embodiments providing the possibility to transport one or more communication identifiers as part of transfer procedures.

An embodiment or use case is illustrated in FIG. 2. The user equipment 3, UE-3, or a user agent UA of the user equipment 3, and the user equipment 2, UE-2, or a user agent UA of the user equipment 2, have an ongoing session such as a communication session or data connection session, e.g. a SIP session, with two audio media flows established, with media labels "abc" and "def". As shown in block or step 1, a protocol session, e.g. SIP session, prior to replacement has a Call-id: xyz@example.com; a to-tag=bbb; a from-tag=aaa; and a SDP: m=audio a=label:abc, and m=audio a=label:def.

Media label attribute may be used, formed or structured e.g. as in session description protocol, SDP, such as described in RFC 4574, or in other form. In the embodiment of FIG. 2, UE-2 supports labels. Whether the UE-2 is SDP offered or answerer, it can assign the labels to the media streams in both cases. The other user equipments 1, 3 may or may not support labels.

When the UE-2 wants e.g. to transfer the audio media flow "abc" to UE-1, but maintain the other media flow "def", the UE-2 may send a message such as e.g. a refer message with a parameter such as a replaces parameter, in a header, e.g. a refer-to header, towards UE-1. The call-id, from-tag and to-tag in the parameter, e.g. replaces parameter refers to the ongoing dialog between UE-2 and UE-3. In addition, the message, or the message header, e.g. replaces header, may contain a label such as the media label "abc", and may include a communication identifier such as ICSI.

In this example the header, e.g. refer-to header, in the refer message may contain an audio media feature tag e.g. as described in RFC 4508 or other. This tag indicates to UE-1 that UE-3 supports audio media. Thus UE-3 may include audio media to the SDP offer it generates due to reception of the refer message.

As shown in FIG. 2, block or arrow 2, the refer message may e.g. indicate

```
Refer-to: <sip:ua-3@example.com;audio?
Replaces="xyz@example.com;
to-tag=bbb;from-tag=aaa;label=abc">?+g.3gpp.icsi="urn:mmtel".
```

In another example embodiment the refer message may e.g. indicate

```
Refer-to: <sip:ua-3@example.com;audio?
Replaces="xyz@example.com;
to-tag=bbb;from-tag=aaa;label=abc">?P-Preferred-
Service="urn:mmtel">;+g.3gpp.icsi="urn:mmtel".
```

The message thus indicates the communication identifier such as an IMS communication service identifier, ICSI, "+g.3gpp.icsi="urn:mmtel"".

The message may also include an application reference identifier such as IARI as an example.

In a step 3, UE 1 checks whether it supports the service indicated by the communication identifier and decides on retrieval depending on the result. If the service is not supported, the replaces procedure is terminated. In case the service is supported, a step 4 is performed in which the UE-1 generates a message such as an invite message towards UE-3. The invite message may contain the replaces header as received in the message 2. The invite message may contain also an SDP with audio media offer with label "abc" that replaces the old media flow "abc". The SDP may contain also a new audio offer with label "ghi". The message may optionally also include the communication identifier received in step 2.

As shown in FIG. 2, step 4, the invite request may for example have the following content:

```
R-URI = sip:ua-3@example.com
Replaces="xyz@example.com;
to-tag=bbb;
from-tag=aaa;
label=abc"
SDP: m=audio a=label:abc
     m=audio a=label:ghi
```

Once the UE-3 receives and accepts the invite message with replaces header, it may generate a message such as a re-invite message 5 towards UE-2. The SDP offer in the re-invite message 5 removes the audio media stream "abc". The re-invite message 5 may include SDP: m=audio 0 a=label:abc.

A response message such as a 200 OK message of SIP may be sent or received for the message such as the invite message (from UE-3 and UE-2). There are now provided one audio media flow "def" between UE-2 and UE-3, and two audio media flows "abc" and "ghi" between UE-1 and UE-3. In block 6, the SIP session post replacement is illustrated, SDP: m=audio a=label:def.

Similar to above example scenario, in another embodiment the UE-3 may be a conferencing server instead, and/or UE-1 and UE-2 may be devices of the same user. In this example embodiment scenario, the user may want to transfer all or only a part of the existing media flows in the conference session from UE-2 to UE-1, while still maintaining, when transferring only part of the media flows, the rest, or part of the rest, of the media flows in UE-2. The same procedures as above can be used also in this scenario.

In the following an embodiment will be described which provides a retrieval procedure.

UE-1 may also use a dialog event package such as e.g. described in RFC 4235 or of other form, to retrieve the ongoing dialogs, e.g. SIP dialogs, either from UE-2 or UE-3. When the UE-1 receives a notify message with the dialog event package body from UE-2 or UE-3, the UE-1 gets aware of the ongoing dialogs between UE-2 and UE-3.

The UE-1 may set a parameter such as an include-session-description parameter to a subscribe request of SIP, in which case the body of the notify message may contain also the media type of each ongoing media stream.

In these embodiments, a dialog event package XML schema may be extended to contain also at least one of a communication identifier such as a communication service identifier, and optionally a media label, such as e.g. described in RFC 4574, as part of the media type in the session description. Thus the UE-1 becomes aware of the media label of one or more or all or each ongoing media stream between UE-2 and UE-3. In this way the UE-1 is able to set the media label to the header, e.g. replaces header in the invite message, as in the above described example.

In the following, embodiments are described which alternatively or additionally provide access transfer in 3GPP MMSC.

FIG. 3 illustrates an embodiment of the invention and a use thereof with multimedia session continuity, e.g. 3GPP Multimedia Session Continuity, and an access transfer procedure.

A UE 4 shown in FIG. 3 may correspond to any one of the UE-1, UE-2, UE-3 of FIG. 2 or to any other terminal. Further shown in FIG. 3 are a media gateway control function, MGCF, 9, an internet protocol multimedia subsystem, IMS, 6, an application or agent server 7 and a far end device 8 which may be a terminal, a user equipment e.g. UE-1, UE-2, UE-3, or any other type of client or apparatus.

In the embodiment of FIG. 3, the UE 4 has an ongoing dialog, e.g. SIP dialog, with the far end 8, as shown in a block 1, existing voice (label=A)+mm (label=B), session over IP-CAN #1. IP-Can stands for IP connectivity access network. In this example, the dialog has voice and multimedia (mm) media streams over the access #1.

The server 7 may e.g. be a MMSC AS, and may have anchored the session. The MMSC AS 7 may provide an IMS-based mechanism for enabling continuity of multimedia sessions between different domains, e.g. circuit-switched, CS, domain and packet-switched domain such as IMS, and for supporting other session continuity scenarios, such as PS-PS continuity, PS-PS in conjunction with CS-PS continuity, and media transfer between different terminals. The MMSC AS 7 may comprise a set of functions required to perform multimedia session continuity and anchor/manage multimedia session. The MMSC AS 7 may also provide session continuity specific charging data. The MMSC AS 7 may act as or be a back-to-back user agent, B2BUA, and may maintain binding between the call-id, from-tag and to-tag in the UE side and far end side. When a new access becomes available for the UE, as shown in block 2 of FIG. 3, the UE 4 may want to transfer the multimedia stream, or part of the stream, to the new access or to another access, but keep e.g. the voice media stream in the old access.

In this case, the UE 4 may register to the subsystem IMS 6 over the new access, and may generate a message, e.g. an invite message, with a header, e.g. replaces header, which may be sent in step 3 to the IMS 6, see message "INVITE with REPLACE label=B (SDP: m=mm a=label:B)". The replaces header may refer to the ongoing SIP dialog between UE 4 and MMSC AS 7 (destined to the far end 8), may also include the media label B that refers to the existing multimedia stream in this SIP dialog, and may include a communication identifier such as a communication service identifier like e.g. ICSI or application reference identifier like e.g. IARI. In addition, the message, e.g. invite message, includes an SDP offer in the body, where multimedia stream with label B is offered. The message, e.g. invite message, is routed to the MMSC AS 7 in the call path.

The MMSC AS 7 interprets the content of the message or message header, e.g. replaces header, in a step 4, application logic, and notices that the existing multimedia stream over old access should be replaced with a new multimedia stream over the new access in this example.

The MMSC 7 generates a message e.g. indicating different contact for medias, such as e.g. a re-invite message, towards the far end terminal or user equipment 8, e.g. via IMS 6, as shown by the arrows of step 5, "RE-INVITE with different contact for medias". The MMSC 7 or message 5 may thus indicate the changed IP address of the multimedia stream, and also possibly changed codec etc attributes. In addition, the MMSC AS 7 may generate a message, e.g. re-invite message towards the UE 4 over the old access, in order to remove the multimedia stream over the old access, as shown by arrows of step/message 6. "6. RE-INVITE (SDP: remove m=mm a=label:B)". As a result, the UE 4 will have in this example two SIP dialogs to the MMSC AS 7, one over old access with voice media stream, and another over the new access with multimedia stream, as illustrated by the double-headed arrow at the left-hand side of FIG. 3. MMSC AS 7 may combine these dialogs together, so that the far end 8 sees only one dialog, e.g. SIP dialog, with two media streams.

In accordance with one or more embodiments of the invention, a media stream transfer/retrieval in 3GPP MMSC may be provided. FIG. 4 presents a further embodiment in accordance with the invention providing such media stream transfer/retrieval.

In FIG. 4, in addition to user equipment 2, the user equipment 4, the IMS 6, the AS 7, and the far end 8 such as a terminal, client, or user equipment are shown similar to the embodiment of FIG. 3. In the example embodiment flow of FIG. 4, the UE-A 4 is having a dialog, e.g. a SIP dialog, with the server, e.g. MMSC AS, 7, and eventually with the far end 8, as indicated by block or step 1, "existing voice (label=A)+ mm (label=B) session over IP-CAN". The dialog has voice and multimedia streams. When the UE-A 4 wants to transfer the multimedia stream, or part thereof, to another device of the user, e.g. UE-B 2, as indicated by step 2, media transfer, the UE-A 4 may send, in step 3, a message, e.g. a refer message, to IMS 6 with or without a communication identifier, and with e.g. a replaces parameter in a refer-to header, as described above. The IMS 6 sends, in step 4, a message, e.g. a refer message, to UE 2 with the communication identifier, and with e.g. a replaces parameter in a refer-to header. In a step 5 the UE-B 2 checks or examines whether or not it is able to support the service indicated by the communication identifier such as a communication service identifier. If not the replaces procedure is terminated.

In case the user equipment 2 is able to support the service indicated by the communication identifier, the UE-B 2 generates, in step 6, a message with a parameter, such as an invite with replaces header with label parameter as described above, e.g. as shown in FIG. 4, step 6. "INVITE with REPLACE label=B (SDP: m=mm a=label:B". The label parameter refers to the multimedia stream between UE-A 4 and MMSC AS 7. The message such as invite is routed to MMSC AS 7.

The AS 7 may perform an application logic function 7, and generate a message for changing an address of the multimedia stream, e.g. a message 8, "RE-INVITE with different contact for medias". This message 8, e.g. re-invite message, is sent to the far end 8 e.g. with SDP offer which changes the remote IP address of the multimedia stream. When the far end 8 accepts or executes the change, the far end 8 may send an accepting message such as 200 OK for invite, to the MMSC AS 7. The AS 7 may generate and send a message such as 200 OK for invite, to UE-B 2. The MMSC AS 7 may also remove the multimedia stream from UE-A 4 by sending a message 9, e.g. re-invite towards the UE-A 4, "RE-INVITE (SDP: remove m=mm a=label:B)" This message 9 may be sent from AS 7 to the UE 4 via the IMS 6.

Alternatively, the UE-B 2 may have retrieved the multimedia stream by sending a message, such as a subscribe for dialog event package message, to MMSC AS 7. The MMSC AS 7 reports the dialogs, e.g. SIP dialogs, which the UE-B 2 is authorized to see, e.g. the dialogs with the same public user identity than UE-B. This policy may vary based on local policy in MMSC AS 7. The MMSC AS 7 may report the SIP dialog with UE-A 4, the notification containing the types of media streams the dialog consists of, and the extension described above to carry the label of each media stream and a communication identifier. The UE-B 2 learns the labels of the media streams between UE-A 4 and MMSC AS 7. The UE-B 2 is now able to retrieve the multimedia stream and generate the message, e.g. invite message with replaces header (with label extension), as in the above described example embodiments.

The user may use multiple UEs and transfer the sessions between them, e.g. transfer the whole session to the target UE, or transfer one media component to the target UE, and release the corresponding media component from the source UE. The same operations may be performed either from source UE (retrieval operations) or target UE (transfer operations).

Also all operations may be performed in conjunction with VCC, e.g. speech media component may be transferred to and from CS network.

It should be noted that the applicability of the procedures described above is not limited to IMS, but can be used in other apparatuses, devices, networks or systems as well such as in an environment e.g. according to Internet Engineering Task Force, IETF, or other types of environment such as e.g. a session initiation protocol environment.

Figure 5:
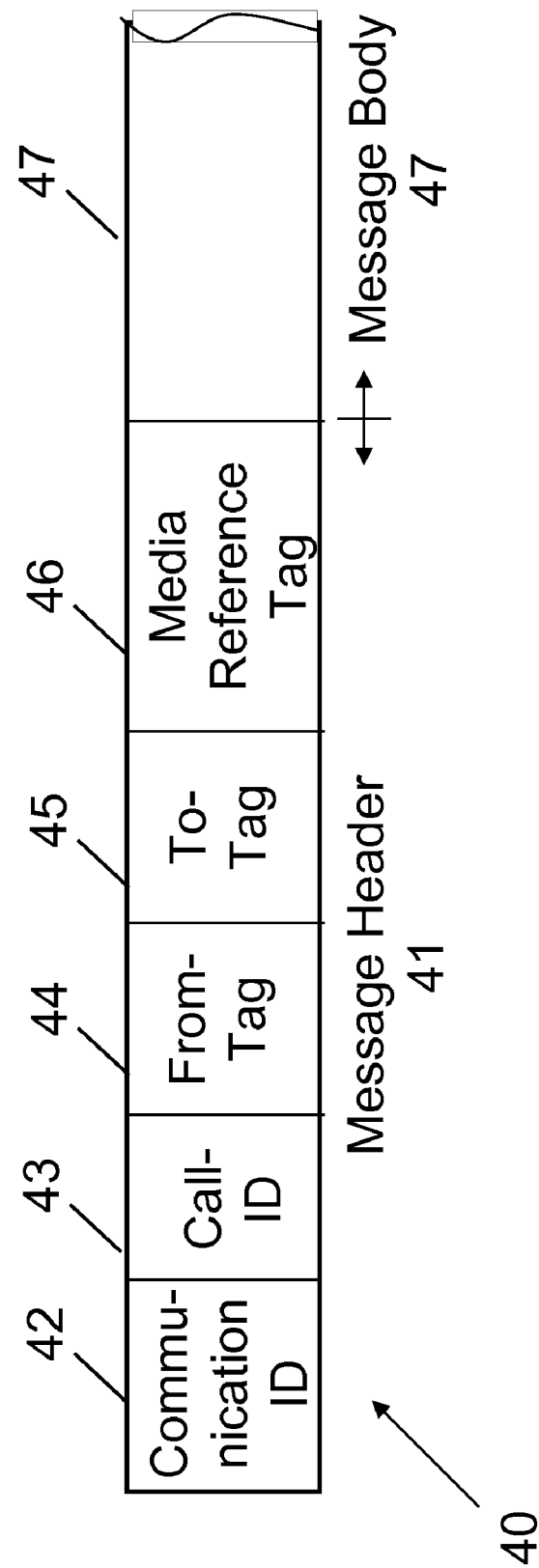
FIG. 5 shows a further embodiment of the invention.

FIG. 5 shows an embodiment of a message 40 which can be transmitted, received or used in accordance with one or more embodiments of the invention, e.g. as any arbitrary one of messages 2, 3, 4 of FIG. 2, messages 3, 5, 6 of FIG. 3, or messages 3, 4, 6, 7 of FIG. 4. The message 40 of FIG. 5 includes a header 41 such as a replaces header, or header of other type, of a protocol message like session initiation protocol, and optionally a message body 47.

The header 41 may be a replaces header, an invite header, a refer header, etc, and may e.g. enable services such as attended call transfer, retrieve from park, and transition from locally mixed conferences to two party calls in a distributed peer-to-peer way. The header 41 may contain an information field 42 indicating a communication identifier such as a communication service identifier e.g. of a multimedia type such as ICSI, a call-id field 43 indicating an identity of the call, a to-tag field 44, a from-tag field 45, and a label or media-reference tag 46.

The replaces header 41 is extended in accordance with one or more embodiments of the invention to include a communication identifier 41.

Figure 6:
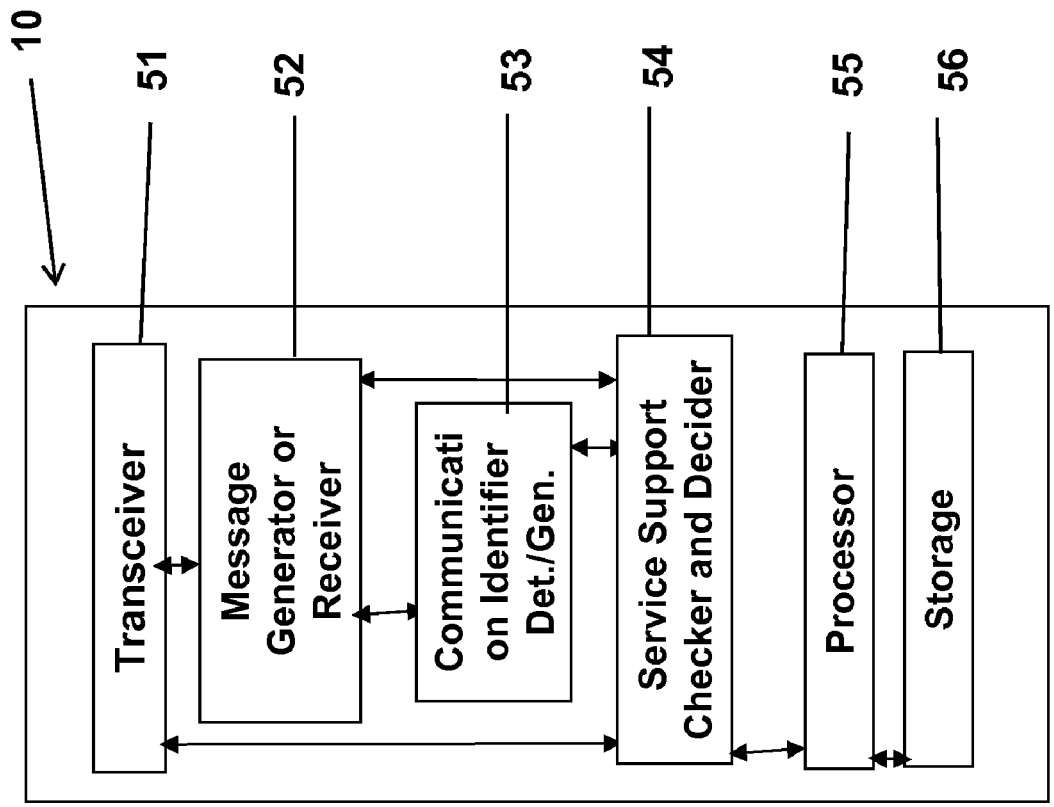
FIG. 6 illustrates another embodiment of the invention.

FIG. 6 shows an embodiment of an apparatus 10 such as a user equipment which may correspond to user equipment 1, 2, 3, 4, 8, or part thereof, or a module or chipset, etc, in accordance with an implementation of the invention. The apparatus 10 may comprise at least one or more or all of a transceiver 51 for transmitting and receiving signals to and from other apparatus e.g. via a base station e.g. the terminal 4, a message generator or receiver 52 for generating or receiving messages such as e.g. SIP messages e.g. as described above or below, a communication identifier generator or detector 53 for generating a communication identifier or detecting a received communication identifier such as a communication service identifier or application reference identifier of a message to be sent or received via the transceiver 51 or airlink, a checker or check device, means or unit and/or decider device, means or unit 54 for checking whether a service indicated by the communication identifier is supported by the apparatus 10, and/or for deciding on transferring the service or session part to or from the apparatus 10, a processor 55 for controlling one or more of the components or modules of the apparatus 5 such as components 51, 52, 53, 56, and a storage 56 for storing at least one or more of a communication identifier such as a communication service identifier, an application reference identifier, content, media, control programs etc.

FIG. 7 illustrates an example embodiment of a dialog in accordance with one or more embodiments of the invention.

The embodiment may e.g. relate to and be implemented or used with a dialog event package such as an INVITE-Initiated dialog event package for session initiation protocol (SIP). As an example, rfc4235 defines a dialog event package for SIP events architecture, along with a data format used in notifications for this package. The dialog package allows users to subscribe to another user and to receive notification of the changes in state of INVITE-initiated dialog usages in which the subscribed-to user is involved.

An example embodiment of a notification body of a message such as e.g. a SIP invite is shown in FIG. 7 and described below.

```
<dialog id="123456">
    <state>confirmed</state>
    <duration>274</duration>
    <ICSI> urn:urn-xxx:3gpp-service.ims.icsi.mmtel
</ICSI>
    <IARI> urn:urn-xxx:3gpp-service.ims.iari.xyz </IARI>
    <local>
        <identity
display="Alice">sip:alice@example.com</identity>
        <target uri="sip:alice@pc33.example.com">
            <param pname="isfocus" pval="true"/>
            <param pname="class" pval="personal"/>
        </target>
    </local>
    <remote>
        <identity
display="Bob">sip:bob@example.org</identity>
        <target uri="sip:bobster@phone21.example.org"/>
    </remote>
```

An embodiment of the dialog comprises in addition to local and remote parameters at least one of a communication service

```
identifier such as <ICSI> urn:urn-xxx:3gpp-
service.ims.icsi.mmtel </ICSI>, and an application reference
identifier such as <IARI> urn:urn-xxx:3gpp-
service.ims.iari.xyz </IARI>.
```

For the purpose of the present invention as described herein above, it should be noted that any access or network technology may be used which may be any technology by means of which a user equipment can access a network. The network may be any device, unit or means by which a mobile or stationary entity or other user equipment may connect to and/or utilize services offered by the network. Such services may include, among others, data and/or (audio-) visual communication, data download etc.

Generally, the present invention is also applicable in those network or terminal environments relying on a data packet based transmission scheme according to which data are transmitted in data packets and which are for example based on the Internet Protocol IP. The present invention is, however, not limited thereto, and any other present or future IP or mobile IP version, or, more generally, a protocol following similar principles is also applicable. The user equipment entity may be any device, unit or means by which a system user may experience services from a network.

Embodiments may be implemented as a network, system, method, or apparatus such as a target user equipment, part of or for a user equipment such as module or chipset, a stationary or mobile terminal, a source terminal etc.

In accordance with one or more embodiments of the invention a network may comprise such an apparatus as mentioned above. The apparatus may be adapted for, or the network may have, an evolved packet service, EPS architecture, an IMS architecture, a long term evolution, LTE, architecture, a general packet radio service, GPRS, a global system for mobile communications, GSM, or any other type of mobile communication or mobile network. The apparatus or network may comprise at least one of an IMS node such as call state control function, serving general packet radio service support node, SGSN, a mobility management entity, MME, or a gateway, etc.

The sequence of method steps described above or shown in the drawings can be implemented in any other sequence arbitrarily deviating from the above described or shown sequence of steps.

Further, the method, apparatuses and devices, may include only one, more or all of the features described above or shown in the drawings, in any arbitrary combination.

The method steps may be implemented as software code portions and be run using a processor at a network element or terminal, can be software code independent, or can be specified using any known or future developed programming language as long as the functionality defined by the method steps is preserved. Generally, any method step is suitable to be implemented as software or by hardware without changing the idea of the present invention in terms of the functionality implemented. Devices, apparatus, units, or means, and/or method steps may be implemented as hardware components of a stationary or mobile station, or a terminal, or a network element, or part, or chipset, or module thereof. The apparatus may be a part, or chipset, or module of an entity such as a terminal, user equipment, network entity etc. The apparatus or software may be hardware independent; and may be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components. Devices, apparatus, units or means (e.g. User equipment, CSCF) can be implemented as individual devices, units, means, chipsets, modules, or part of devices, and may also be implemented in a distributed fashion throughout a system, as long as the functionality of the device, unit or means is preserved.

The invention claimed is:
1. An apparatus, comprising:
a subscriber configured to perform a subscription to a dialog event package including an internet protocol multimedia subsystem communication service identifier of an ongoing session or part of an ongoing session between a source apparatus and a target apparatus, said internet protocol multimedia subsystem communication service identifier identifying an internet protocol multimedia subsystem communication service of the session or part of the session,
a detector configured to detect the internet protocol multimedia subsystem communication service identifier in the dialog event package,
a checker configured to check the detected internet protocol multimedia subsystem communication service identifier, and
a retriever configured to retrieve the ongoing session or part of the ongoing session by the apparatus depending on the internet protocol multimedia subsystem communication service identifier, the session or part of the session being transferred so as to be continued between the source apparatus and the apparatus instead of between the source apparatus and the target apparatus.

2. Apparatus according to claim 1, comprising:
a detector configured to detect or learn session details of the session or part of the session, wherein the session details comprise at least one of
the internet protocol multimedia subsystem communication service identifier,
at least one session ongoing media stream,
at least one stream label,
a call identifier,
one or more media components of a session,
a reference identifier,
an application reference identifier, and
an internet protocol multimedia subsystem application reference identifier.

3. Apparatus according to claim 1, wherein the apparatus is at least one of a terminal, mobile station, user equipment, a part of a terminal, mobile station, user equipment, a module, and a chipset.

4. Apparatus according to claim 1, wherein the session is at least one of a data session, a voice call session, a session according to a protocol for initiating a session, and a session initiation protocol session.

5. Apparatus according to claim 1, wherein the apparatus comprises a detector configured to detect support of the identified internet protocol multimedia subsystem communication service based on the internet protocol multimedia subsystem communication service identifier, and to decide on transferring the internet protocol multimedia subsystem communication service depending on the internet protocol multimedia subsystem communication service identifier.

6. Apparatus according to claim 1, comprising a processor configured:
to receive a request to retrieve a session or media, and
to perform a subscription to the dialog event package upon receipt of the request.

7. Apparatus according to claim 6, the processor being configured to receive the subscription from at least one of a multimedia system, a user equipment and an application server.

8. An apparatus, comprising:
means for performing a subscription to a dialog event package including an internet protocol multimedia subsystem communication service identifier of an ongoing session or part of an ongoing session between a source apparatus and a target apparatus, said internet protocol multimedia subsystem communication service identifier identifying an internet protocol multimedia subsystem communication service of the session or part of the session,
means for detecting the internet protocol multimedia subsystem communication service identifier in the dialog event package,
means for checking the internet protocol multimedia subsystem communication service identifier, and
means for retrieving the ongoing session or part of the ongoing session by the apparatus depending on the internet protocol multimedia subsystem communication service identifier, the session or part of the session being transferred so as to be continued between the source apparatus and the apparatus instead of between the source apparatus and the target apparatus.

9. Apparatus according to claim 8, comprising:
means for learning or providing session details of the session or part of the session, wherein the session details comprise at least one of the internet protocol multimedia subsystem communication service identifier, of an ongoing session according to a protocol for initiating a session, at least one session ongoing media stream, at least one stream label, a call identifier, one or more media components of a session, a reference identifier, an application reference identifier, and an internet protocol multimedia subsystem application reference identifier.

10. Apparatus according to claim 8, wherein the apparatus is at least one of a terminal, mobile station, user equipment, module, chipset.

11. A method, comprising:
performing, by a subscriber of an apparatus, a subscription to a dialog event package including an internet protocol multimedia subsystem communication service identifier of an ongoing session or part of an ongoing session between a source apparatus and a target apparatus, said internet protocol multimedia subsystem communication service identifier identifying an internet protocol multimedia subsystem communication service of the session or part of the session,
detecting, by a detector of the apparatus, the internet protocol multimedia subsystem communication service identifier in the dialog event package,
checking, by a checker of the apparatus, the internet protocol multimedia subsystem communication service identifier, and
retrieving, by a retriever of the apparatus, the ongoing session or part of the ongoing session depending on the internet protocol multimedia subsystem communication service identifier, the session or part of the session being transferred so as to be continued between the source apparatus and the apparatus instead of between the source apparatus and the target apparatus.

12. The method according to claim 11, comprising:
learning or providing, by a detector of the apparatus, session details of the session or part of the session, wherein the session details comprise at least one of the internet protocol multimedia subsystem communication service identifier, at least one session ongoing media stream, at least one stream label, a call identifier, one or more media components of a session, a reference identifier, an application reference identifier, and an internet protocol multimedia subsystem application reference identifier.

13. The method according to claim 11, wherein the session is at least one of a data session, a voice call session, a session according to a protocol for initiating a session, and a session initiation protocol session.

14. The method according to claim 11, comprising:
detecting, by a detector of the apparatus, support of the identified internet protocol multimedia subsystem communication service based on the internet protocol multimedia subsystem communication service identifier, and
deciding, by the detector of the apparatus, on transferring the internet protocol multimedia subsystem communication service depending on the detection result.

15. The method according to claim 11, comprising:
receiving, by a processor of the apparatus, a request to retrieve a session or media, and
performing, by the processor of the apparatus, a subscription to the dialog event package upon receipt of the request.

16. The method according to claim 11, comprising:
receiving, by a processor of the apparatus, the subscription from at least one of a multimedia system, a user equipment and an application server.

17. A computer program product tangibly embodied in a non-transitory computer readable storage medium comprising computer-executable components configured to carry out or implement, when run on a computer of an apparatus, performing, by a subscriber of the apparatus, a subscription to a dialog event package including an internet protocol multimedia subsystem communication service identifier of an ongoing session or part of an ongoing session between a source apparatus and a target apparatus, said internet protocol multimedia subsystem communication service identifier identifying an internet protocol multimedia subsystem communication service of the session or part of the session, detecting, by a detector of the apparatus, the internet protocol multimedia subsystem communication service identifier in the dialog event package, checking, by a checker of the apparatus, the internet protocol multimedia subsystem communication service identifier, and retrieving, by a retriever of the apparatus, the ongoing session or part of the ongoing session by the apparatus depending on the internet protocol multimedia subsystem communication service identifier, the session or part of the session being transferred so as to be continued between the source apparatus and the apparatus instead of between the source apparatus and the target apparatus.

18. The computer program product according to claim 17, comprising code means configured to:

learn or provide session details of the session or part of the session, wherein the session details comprise at least one of the internet protocol multimedia subsystem communication service identifier, of an ongoing session according to a protocol for initiating a session, at least one session ongoing media stream, at least one stream label, a call identifier, one or more media components of a session, a reference identifier, an application reference identifier, and an internet protocol multimedia subsystem application reference identifier.

19. The computer program product according to claim 18, comprising:

code means for detecting support of the identified protocol multimedia subsystem communication service based on the protocol multimedia subsystem communication service identifier, and for deciding on transferring the protocol multimedia subsystem communication service depending on the protocol multimedia subsystem communication service identifier.

\* \* \* \* \*